US007106342B2

(12) United States Patent
Yoon et al.

(10) Patent No.: US 7,106,342 B2
(45) Date of Patent: Sep. 12, 2006

(54) METHOD OF CONTROLLING BRIGHTNESS OF USER-SELECTED AREA FOR IMAGE DISPLAY DEVICE

(75) Inventors: Jong Kun Yoon, Gumee-shi (KR); Byung Han Kim, Gumee-shi (KR); Hong Ki Kim, Taegu (KR); Alexander Shafir, Gumee-shi (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/256,233

(22) Filed: Sep. 27, 2002

(65) Prior Publication Data

US 2004/0061705 A1 Apr. 1, 2004

(51) Int. Cl.

| | |
|---|---|
| ***G09G 5/02*** | (2006.01) |
| ***H04N 7/08*** | (2006.01) |
| ***H04N 5/57*** | (2006.01) |
| ***G06K 9/48*** | (2006.01) |
| *G09G 5/30* | (2006.01) |
| *H04N 7/01* | (2006.01) |

(52) U.S. Cl. ........................ 345/589; 345/690; 345/77; 348/458; 348/477; 348/687; 382/199

(58) Field of Classification Search ................ 345/690, 345/426, 589, 781, 788, 799, 204, 593–594, 345/619, 77; 715/722, 781; 348/443, 437.1, 348/428.1, 434.1, 526, 439.1, 458, 477, 644–651, 348/687; 382/193, 199

See application file for complete search history.

(56) References Cited

U.S. PATENT DOCUMENTS

| | | | | |
|---|---|---|---|---|
| 4,733,229 A * | 3/1988 | Whitehead | 345/20 |
| 5,987,624 A * | 11/1999 | Eglit | 714/32 |
| 6,122,002 A * | 9/2000 | Ohara et al. | 348/191 |
| 6,226,040 B1 * | 5/2001 | Kuo et al. | 348/446 |
| 6,288,721 B1 * | 9/2001 | Donoghue et al. | 345/426 |
| 2002/0109669 A1 * | 8/2002 | Ha | 345/156 |

FOREIGN PATENT DOCUMENTS

| | | |
|---|---|---|
| CN | 1345433 | 4/2002 |
| EP | 0957631 | 4/1999 |
| JP | 01-188896 | 7/1989 |
| JP | 10-326091 | 12/1998 |
| JP | 11-327519 | 11/1999 |
| JP | 2002-149142 | 5/2002 |
| WO | 01/41117 | 6/2001 |
| WO | 0141117 | 6/2001 |

* cited by examiner

*Primary Examiner*—Wesner Sajous
(74) *Attorney, Agent, or Firm*—Mayer, Brown, Rowe & Maw LLP

(57) ABSTRACT

A method of controlling brightness of a user-selected area on a monitor screen is disclosed. First, a starting point of a topmost line of a displayed image is determined as a new reference point. Then a line pattern being included in one of image lines of the displayed image is detected. The pattern includes an indicator whose ends are horizontally aligned with vertical edges of the user-selected area. Next, horizontal distances of the vertical edges with respect to the reference point, and a highlight area is identified using the measured horizontal distances. Finally, a brightness gain of the identified highlight area is amplified.

28 Claims, 5 Drawing Sheets

METHOD OF CONTROLLING BRIGHTNESS OF USER-SELECTED AREA FOR IMAGE DISPLAY DEVICE

BACKGROUND OF THE INVENTION

1. Field of the Invention

The present invention relates to an image display device, and more particularly, to a method of controlling brightness of a user-selected area for an image display device.

2. Discussion of the Related Art

Typical computer-related display systems use a Cathode Ray Tube (CRT) monitor for displaying various types of data including video and text. For displaying video data such as motion pictures, graphics, and photographs on the CRT monitor, a reasonably high level of luminosity is often required because far more colors are used to provide realistic shading and variations in color. The increase in the luminosity range of the video data on the CRT monitor makes the video image richer in contrast and brightness, improving the perceptual quality of the image.

However, compared to TV systems, the existing computer-related display systems that include a CRT monitor usually do not provide enough luminosity when displaying the mentioned video data. For example, when a video signal for an ordinary TV system (e.g., a broadcasting video signal or any other signal for display on a TV screen) is displayed on one of the oridinary CRT monitors, the brightness of the displayed image is typically too low and the image is too dark and shadowy. This is because the brightness parameters of the existing computer-related display systems are usually much less than those of the TV systems.

In order to obviate the problem set above, it would be highly desirable to have a method of greatly increasing the luminosity level of a user-selected area of the CRT screen while retaining the luminosity of the all other areas at a relatively lower level. In this way, the perceptual image-quality of the user-selected area can be greatly improved without increasing the brightness of the whole screen, providing a desirable solution to the above-mentioned problem.

SUMMARY OF THE INVENTION

Accordingly, the present invention is directed to a method of controlling brightness of a user-selected area on a monitor screen that substantially obviates one or more problems due to limitations and disadvantages of the related art.

An object of the present invention is to provide a method of controlling brightness of a user-selected area on a monitor screen that compensates delays that occur between a video signal and horizontal sync signals that a CRT monitor receives from a video card.

Another object of the present invention is to provide a method of controlling brightness of a user-selected area on a monitor screen that compensates a vertical offset due to difference display settings between a CRT monitor and an application of a PC.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of controlling brightness of a user-selected area on a monitor screen includes the steps of determining a starting point of a topmost image line of a displayed image as a new reference point; detecting a line pattern included in one of image lines of the displayed image, the pattern including an indicator whose ends are horizontally aligned with vertical edges of the user-selected area; measuring horizontal distances of the vertical edges with respect to the reference point; identifying a highlight area by calculating horizontal coordinates of the highlight area from the measured horizontal distances; and amplifying a brightness gain of the identified highlight area.

In another aspect of the present invention, a method of controlling brightness of a user-selected area on a monitor screen includes the steps of determining a starting point of a topmost image line of a displayed image as a reference point; detecting a line pattern included in one of image lines of the displayed image, the pattern including vertical distances of the user-selected area with respect to the pattern-included image line; measuring a vertical offset distance between the reference point and the pattern-included image line; identifying a highlight area by calculating vertical coordinates of the highlight area from the measured offset distance; and amplifying a brightness gain of the identified highlight area.

In another aspect of the present invention, a method of controlling brightness of a user-selected area on a monitor screen includes steps of determining a starting point of a topmost line of a displayed image as a new reference point; detecting a line pattern included in one of image lines of the displayed image, the pattern including an indicator whose ends are horizontally aligned with vertical edges of the user-selected area, the pattern further including vertical distances of the user-selected area with respect to the pattern-included image line; measuring horizontal distances of the vertical edges with respect to the reference point and further measuring a vertical offset distance between the reference point and the pattern-included image line; identifying a highlight area by calculating horizontal and vertical coordinates of the highlight area, the horizontal coordinates being calculated from the measured horizontal distances, the vertical coordinates being calculated from the measured offset distance; and amplifying a brightness gain of the identified highlight area.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
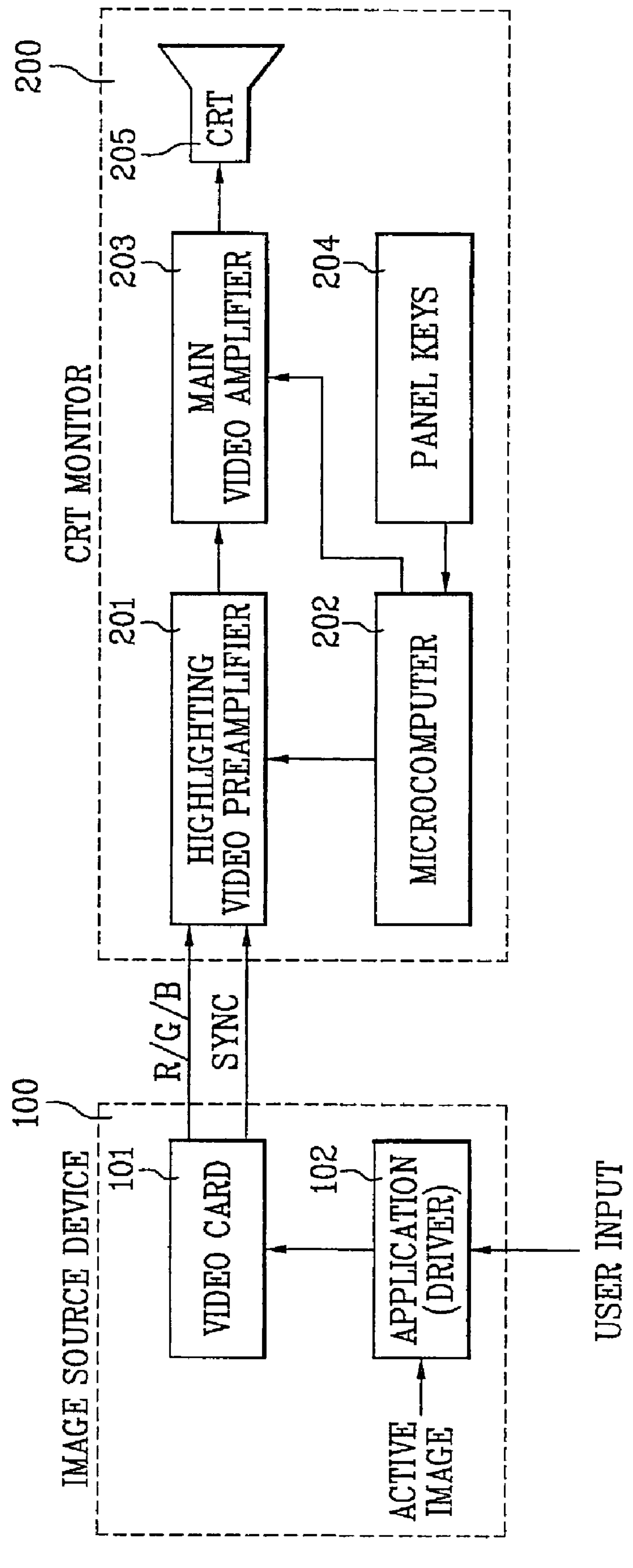
FIG. 1 illustrates an image display system.

FIG. 1 illustrates an image display system. The system includes an image source device 100 (e.g., a computer) that generates a video signal (an R/G/B signal) and horizontal and vertical sync signals (H-SYNC and V-SYNC) and a CRT (Cathode Ray Tube) monitor 200 that receives the video signal and SYNC signals from the image source device 100 and displays an image based on the received video and SYNC signals. The image source device 100 includes an application unit (e.g., an installed program or driver) 102 that receives information representing an original image and adds a line pattern to the topmost image line of the original image, and a video card 101 that receives the information representing the pattern-added original image and generates a video signal and H-SYNC and V-SYNC signals. The line pattern includes coordinate information of an area selected by a user in the original image.

The CRT monitor 200 includes panel keys 204, a microcomputer 202, a highlighting video preamplifier 201, a main video amplifier 203, and a CRT 205. The highlighting video preamplifier 201 receives the R/G/B signal and SYNC signals from the video 101 and controls brightness of the user-selected area by detecting the pattern previously included by the application unit 102. The microcomputer 202 of the CRT monitor provides a pixel frequency to the highlighting video preamplifier 201 so as to properly display an image in response to the drive signal received from the video card 100. The panel key inputs a command received from the user for controlling display settings of the CRT monitor 200, and the main video amplifier 203 amplifies each of the R, G, and B signals. Then the CRT 205 displays the amplified signals.

Figure 2:
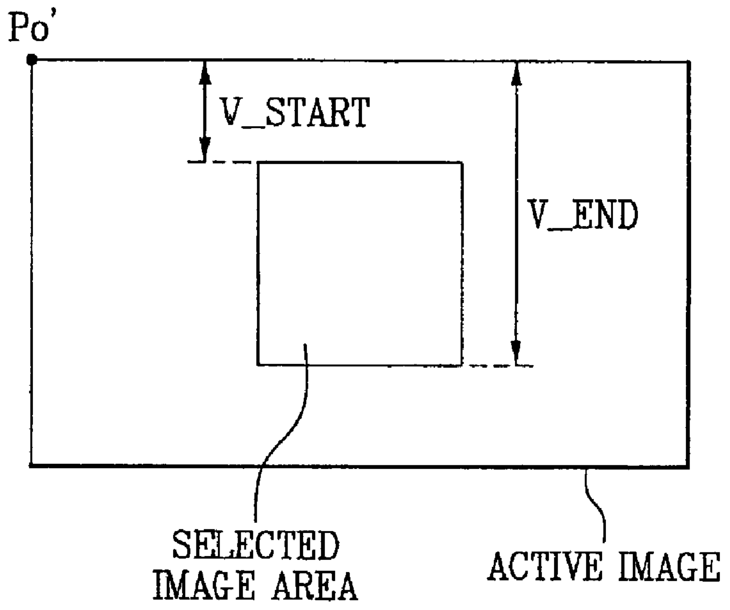
FIG. 2 illustrates an example of an active image represented by image information generated by an application of a PC.

FIG. 2 illustrates an active image represented by the image information that the application unit 102 provides to the video card 101. The application unit 102 of the image source device 100 allows a user to select a desired area (a rectangular box) that needs to be highlighted. The desired area can be selected by, for example, clicking the upper left corner of the desired area with a mouse pointer controlled by a mouse (not illustrated) connected to the image source device 100 and dragging the mouse pointer to the lower right corner of the desired area. Alternatively, the desired area can be simply selected by clicking a window being currently displayed within the active image or by pressing one or more key buttons provided on a keyboard (not illustrated).

When the user selects the desired area for highlighting, the application unit 102 stores the coordinate information of the selected highlight area. The coordinate information includes V_START and V_END, the vertical positions of the upper and lower edges of the selected area with respect to a reference point (e.g., Po' shown in FIG. 2) of the active image. The application unit 102 may further stores H_START and H_END, the horizontal positions of the left and right edges of the selected area with respect to the reference point, but these information are not necessarily required for highlighting the selected area in accordance with the present invention. The values of the vertical positions that are stored by the application unit 102 are in lines while the values of the horizontal positions are in pixels. This is because the application unit 102 uses a coordinate system, in which the vertical and horizontal positions of any point in the active image are in lines and pixels, respectively.

After the application unit 102 stores the required coordinate information, then it adds a line pattern to the topmost line of the active image. The pattern includes pattern data that includes coordinate information of the user-selected area (V_START and V_END), a control code, and a pattern-verification code (e.g., checksum). The pattern may further include position information indicating the horizontal positions of the user-selected area. The control code is a code that includes brightness parameters for highlighting one or more user-selected areas and/or any other video parameters such as contrast or emphasis parameters. The application unit 102 ensures proper transmission of the pattern by including a pattern-verification code such as a checksum that allows operations of the CRT monitor 200 to verify that the data in the transmitted pattern has not changed during transmission and to prevent detecting any non-pattern portion of a video signal as a pattern. Typically, a checksum is a number that represents the summation of representative values of all the text in the transmitted pattern data that both the application unit 102 and the CRT monitor 200 may determine. Then, the receiver can verify the data in the pattern by comparing the checksum included in the pattern to a checksum determined by the CRT monitor 200.

Referring back to FIG. 1, after the video card 101 of the image source device 100 receives image information that defines the pattern-added active image from the application unit 102, the video card 101 processes the received image information to generate a RGB signal and horizontal and vertical sync signals (H-SYNC and V-SYNC) to control the operation of the CRT monitor 200. Then the highlighting video preamplifier 201 of the CRT monitor receives the RGB and SYNC signals and performs the highlighting function on the user selected area. Thereafter, the pre-amplified RGB signals are sent to the main video amplifier 203 that amplifies each of the RGB signals and sends the amplified signals to the CRT 205.

Figure 3:
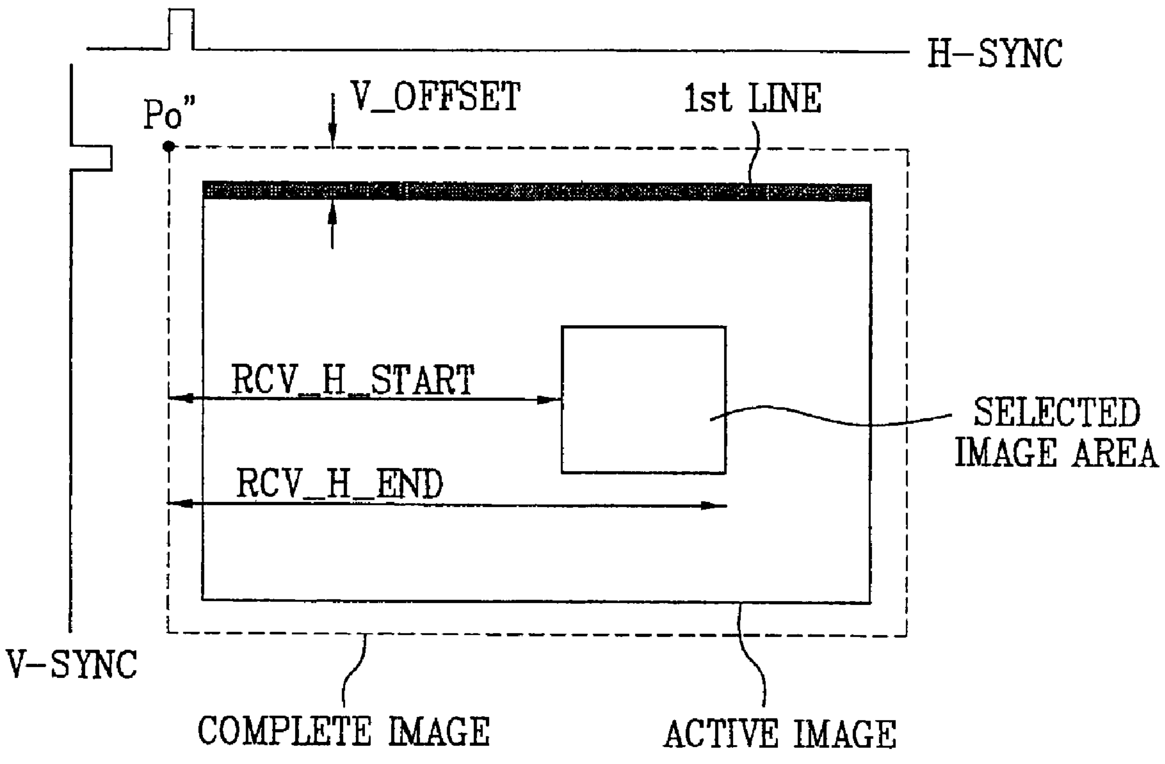
FIG. 3 illustrates an example of a displayed image based on a video signal and SYNC signals.

FIG. 3 illustrates an actual image being displayed on the CRT 205 in response to the RGB signals and the SYNC signals that the CRT monitor 200 receives from the video card 101. Referring to FIG. 3, it is important to note that the image being actually displayed on the CRT 205 does not exactly coincide with the active image that application unit 102 sends to the video card 101, but it is rather a complete image being larger than the active image due to different display settings between the CRT monitor 200 and the application unit 102. The coordinate system used for representing the position of a point on the complete image shown in FIG. 3 is different from that of the active image shown in FIG. 2. This means that the position of any point in the complete image is measured with respect to a reference point (e.g., Po") in the complete image instead of a reference point (Po') in the active image. In addition, a delay often occurs between the RGB signals and SYNC signals that the CRT monitor receives from the video card 101. This delay generates a further coordinate inconsistency between the complete image and the active image.

Figure 4:
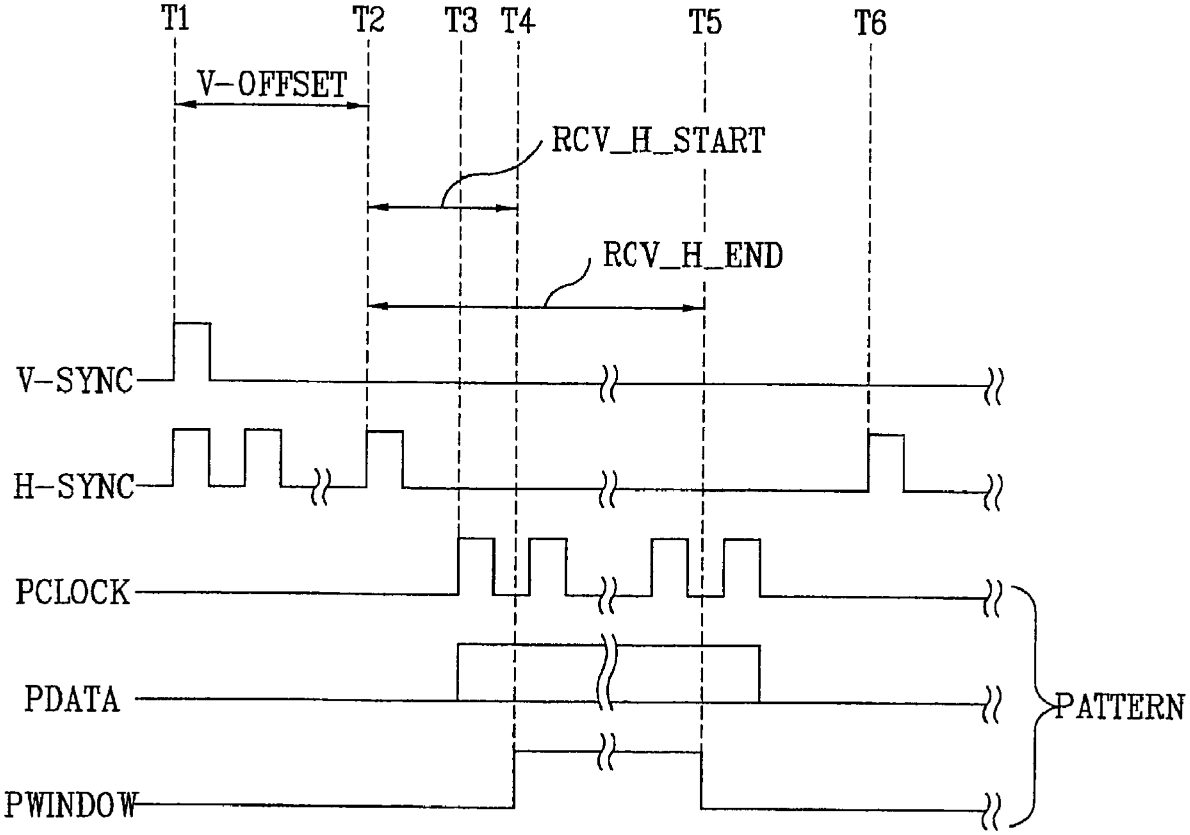
FIG. 4 illustrates SYNC signals and a pattern line signal.

FIG. 4 illustrates the actual V-SYNC, H-SYNC, and a video line signal including a pattern that the highlighting video preamplifier 201 receives from the video card 101. As explained earlier, the video signal corresponding to the first line of the active image includes a pattern signal. The pattern signal is composed of PCLOCK, PDATA, and PWINDOW signals, each of which is included, for example, in the first R, G, and B signals, respectively. More details regarding FIG. 3 and FIG. 4 will be further explained later in this section.

Figure 5:
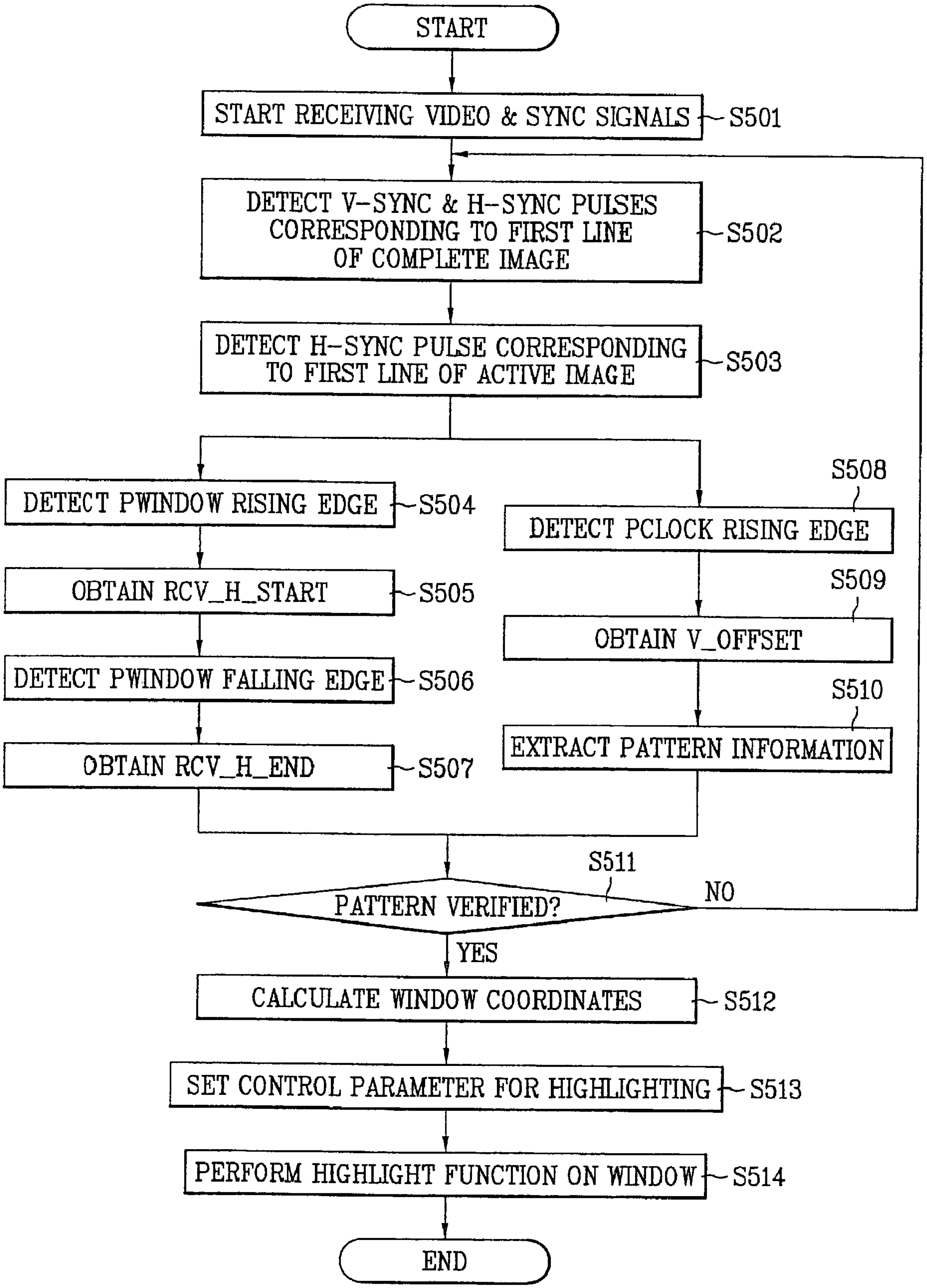
FIG. 5 illustrates a method of controlling brightness of a user-selected area on a monitor screen in accordance with the present invention.

Reference will now be made in detail to the method of controlling brightness of a user-selected area for a monitor in according to the present invention, which is illustrated in FIG. 5. First of all, the highlighting video preamplifier 201 of the CRT monitor starts receiving a RGB signal and H-SYNC and V-SYNC signals from the video card 101 of the image source device 100 (S501). Referring back to FIG. 4, the preamplifier 201 initially detects a V-SYNC pulse and a first H-SYNC pulse at time=T1 (S502). The detected SYNC pulses correspond to the beginning point (Po") of the first video line of the complete image shown in FIG. 3. Between T1 and T2, the preamplifier detects further H-SYNC pulses and a line counter of the preamplifier 201 keeps counting the line number of the video lines detected by the preamplifier 201 before T2.

At time=T2, the preamplifier detects a H-SYNC pulse that correspond to the beginning of the video line of the complete image that includes the topmost line of the active image (S503). Thereafter, the preamplifier 201 detects a first rising edge of the PCLOCK signal at time=T3 (S508). At this time, the preamplifier 201 is able to determine V-OFFSET which represents the number of the video lines detected by the preamplifier 201 before detecting the video line that includes the topmost line of the active image (S509). The V-OFFSET can be simply calculated by taking a number counted by the line counter of the preamplifier 201.

In addition, the preamplifier 201 extracts the pattern data from the received PDATA signal (S510). PDATA is a signal that includes "0" or "1" according to the real pattern data included therein as shown in FIG. 4. As mentioned earlier, the extracted pattern data includes V_START and V_END, a control code, and a checksum. V_START and V_END represent the vertical positions of the upper and lower edges of the user-selected area with respect to a reference point (e.g., Po' shown in FIG. 2) in the active image. The control code is a code that includes the brightness parameter for highlighting the user-selected area and/or other type of video parameters such as contrast, color temperature, distortion, or emphasis parameters. The checksum is a pattern-verification code that allows the preamplifier 201 of the monitor 200 to verify the pattern data.

The pattern further includes a PWINDOW signal that indicates the horizontal positions of the user-selected area with respect to a reference point in the complete image (e.g., Po" shown in FIG. 3). At time=T4, the preamplifier 201 detects the rising edge of the PWINDOW signal (S504). Then the preamplifier 201 determines RCV_H_START, which represents the horizontal position of the left edge of the user-selected area shown in FIG. 3 with respect to Po" in the complete image, using a pixel counter that counts the number of pixels that exist between T2 and T4. The pixel counter uses the pixel frequency value provided by the microcomputer 202 in order to count each pixel. Thereafter, the preamplifier 201 detects the falling edge of the PWINDOW signal (S506) at T5. Similarly, the preamplifier 201 uses the pixel counter to determines RCV_H_END, which represents the horizontal position of the right edge of the user-selected area shown in FIG. 3 with respect to Po" in the complete image, using the pixel counter that also counts the number of pixels that exist between T2 and T5 (S507).

Figure 6:
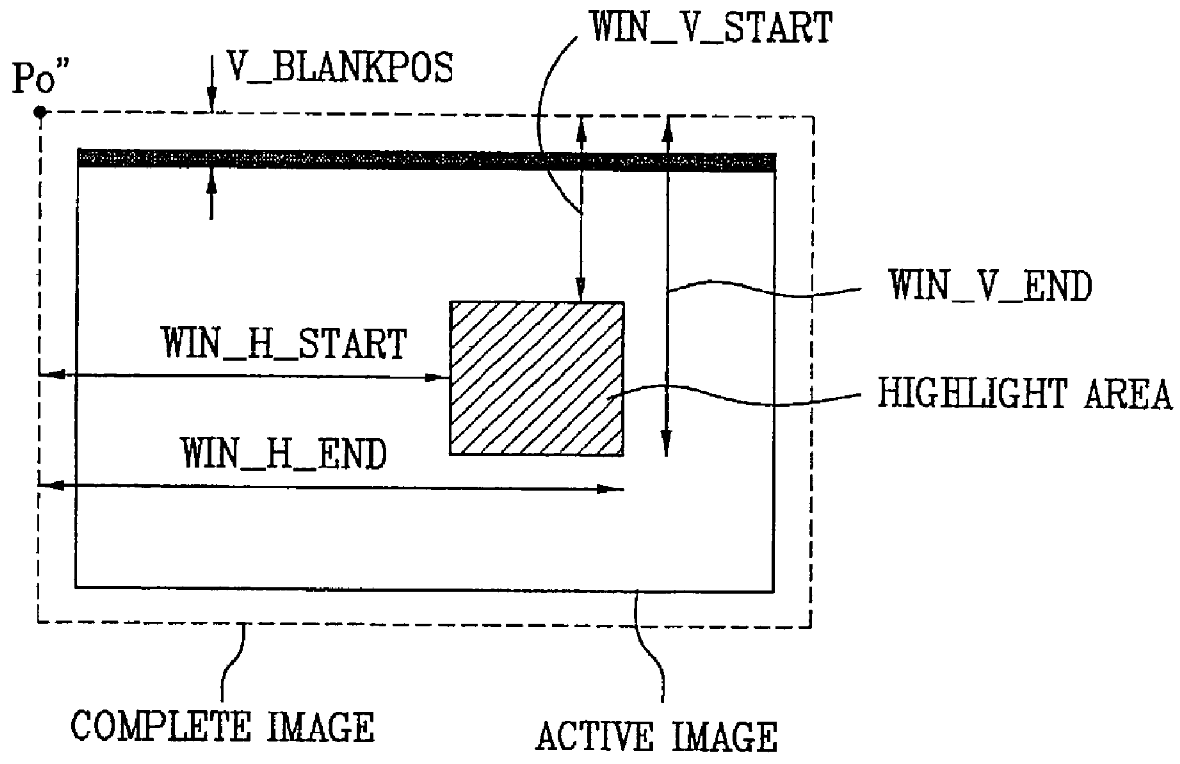
FIG. 6 illustrates the graphical representation of coordinate parameters of a highlight area calculated in accordance with the present invention.

After RCV_H_END is obtained in the step S507 and the pattern data is completely received in the step S510, the preamplifier 201 verifies whether the pattern data is valid by comparing the checksum included in the pattern data and a checksum that it determines (S511). If it is found to be invalid, the preamplifier 201 repeats the steps S502 to S511. Otherwise, it calculates the coordinate parameters of an actual highlight area with respect to the reference point of the complete image as shown in FIG. 6 by using the following equations (S512):

WIN_*V*_START=*V*_OFFSET+*V*_START,

WIN_*V*_END=*V*_OFFSET+*V*_END,

WIN_H_START=RCV_H_START,

WIN_H_END=RCV_H_END, and

V_BLANKPOS=V_OFFSET.

FIG. 6 illustrates the graphical representation of the coordinate parameters of the actual highlight area, which are calculated by using the above equations. As shown, WIN_V_START and WIN_V_END represent the vertical positions of the upper and lower edges of the highlight area with respect to the reference point, Po", and WIN_H_START and WIN_H_END represent the horizontal positions of the left and right edges of the highlight area with respect to the same point. In addition, V_BLANKPOS represents the vertical position of the video line of the complete image that can be optionally blanked out. By blanking out the video line that includes the topmost video line of the active image shown in FIG. 6, the user may not be disturbed from viewing the pattern line on the monitor.

Referring back to FIG. 5, when all the coordinate parameters of the highlight area are calculated, the preamplifier 201 sets the highlight parameter of the highlight area to the brightness parameter value included in the control code, which is included in the pattern data extracted in the step S510 (S513). Finally, the preamplifier 201 performs the highlight function on the highlight area by amplifying the brightness gain of the highlight area, whose positions are defined by WIN_V_START, WIN_V_END, WIN_H_START, and WIN_H_END as shown in FIG. 6 (S514).

Alternatively, WIN_H_START and WIN_H_END can be calculated by using the following equations:

WIN_*H*_START=*RCV*_*H*_START+*HDELAY*1, and

WIN_*H*_END=*RCV*_*H*_END+*HDELAY*2, where HDELAY1 and HDELAY2 represent additional adjustments for compensating the delays that occurs between an analog input and a hardware output when amplifying the brightness gain.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling brightness of a user-selected area on a monitor screen, the method comprising:

displaying an image frame comprising a plurality of image lines and a line pattern integrated in one of said plurality of image lines of said image frame;

determining a starting point of a topmost image line of said displayed image frame as a reference point;

detecting said line pattern included in one of said plurality of image lines of said displayed image frame, said pattern including an indicator signal wherein rising and falling edges of the indicator signal are aligned with vertical edges of the user-selected area;

measuring horizontal distances of said vertical edges with respect to said reference point;

identifying the user-selected area corresponding to a selected sub-area by calculating horizontal coordinates of the user-selected area from said measured horizontal distances; and amplifying a brightness gain of said identified user-selected area.

2. The method of claim 1, wherein said brightness gain is amplified in accordance with a brightness parameter further included in said pattern.

3. The method of claim 1, further comprising:

detecting an original checksum further included in said line pattern; and calculating a new checksum and comparing said new checksum with said original checksum for verification of said pattern.

4. The method of claim 3, wherein said coordinates of said highlight area are calculated only if said pattern is verified.

5. The method of claim 1, wherein said horizontal distances of said vertical edges are measured by measuring horizontal distances to the rising and falling edges of the indicator signal with respect to a starting point of said pattern-included image line.

6. The method of claim 5, wherein said horizontal distances to the rising and falling edges of the indicator signal are measured by counting a number of pixels that are located between said starting point of said pattern-included image line and the rising and falling edges of the indicator pulse, respectively.

7. The method of claim 1, wherein said pattern further includes vertical distances of said user-selected area with respect to said pattern-included image line.

8. The method of claim 7, wherein the user-selected area is identified by further calculating vertical coordinates of the user-selected area from a vertical offset distance between the topmost image line of the displayed image and said pattern-included image line.

9. The method of claim 1, wherein said horizontal coordinates of the user-selected area are equivalent to said measured horizontal distances of said vertical edges.

10. A method of controlling brightness of a user-selected area on a monitor screen, the method comprising:

displaying an image frame comprising a plurality of image lines and a line pattern integrated in one of said plurality of image lines of said image frame;

determining a starting point of a topmost image line of said displayed image frame as a reference point;

detecting said line pattern included in one of said plurality of image lines of said displayed image frame, said pattern including vertical distances values of said user-selected area with respect to said pattern-included image line;

measuring a vertical offset distance between the topmost image line of the displayed image and said pattern-included image line;

identifying the user-selected area calculating vertical coordinates of said user selected area from said measured offset distance; and amplifying a brightness gain of said identified user-selected area.

11. The method of claim 10, wherein said brightness gain is amplified in accordance with a brightness parameter further included in said pattern.

12. The method of claim 10, further comprising:

detecting an original checksum further included in said line pattern; and calculating a new checksum and comparing said new checksum with said original checksum for verification of said pattern.

13. The method of claim 12, wherein said coordinates of the user-selected area are calculated only if said pattern is verified.

14. The method of claim 10, wherein said vertical offset distance is measured by counting each image line being located between the topmost image line of the displayed image and said pattern-included image line.

15. The method of claim 10, wherein said pattern including an indicator signal whose rising and falling edges ends are aligned with vertical edges of the user-selected area.

16. The method of claim 15, wherein the user-selected area is identified by further calculating horizontal coordinates of the user-selected area from horizontal distances of said vertical edges with respect to said reference point.

17. The method of claim 10, wherein said vertical coordinates of the user-selected area are obtained by adding said measured offset distance with said vertical distances of said user-selected area, respectively.

18. A method of controlling brightness of a user-selected area on a monitor screen, said method comprising:

displaying an image frame comprising a plurality of image lines and a line pattern integrated in one of said plurality of image lines of said image frame;

determining a starting point of a topmost line of said displayed image frame as a reference point;

detecting said line pattern included in one of said plurality of image lines of said displayed image frame, said pattern including an indicator pulse whose rising and falling edges are aligned with vertical edges of the user-selected area, said pattern further including vertical distance values of the user-selected area with respect to said pattern-included image line;

measuring horizontal distances of said vertical edges with respect to said reference point and further measuring a vertical offset distance between the topmost image line of the displayed image and said pattern-included image line;

identifying the user-selected area by calculating horizontal and vertical coordinates of the user-selected area, said horizontal coordinates being calculated from said measured horizontal distances, said vertical coordinates being calculated from said measured offset distance; and amplifying a brightness gain of the identified user-selected area.

19. The method of claim 18, wherein said brightness gain is amplified in accordance with a brightness parameter further included in said pattern.

20. The method of claim 18, further comprising:

detecting an original checksum included in said line pattern; and calculating a new checksum and comparing said new checksum with said original checksum for verification of said pattern.

21. The method of claim 20, wherein said horizontal and vertical coordinates of the user-selected area are calculated only if said pattern is verified.

22. The method of claim 18, wherein said horizontal distances of said vertical edges are measured by measuring horizontal distances to the rising and falling edges of the indicator pulse with respect a starting point of said pattern-including image line.

23. The method of claim 22, wherein said horizontal distances to the rising and falling edges of the indicator pulse are measured by counting a number of pixels that are located between said starting point of said pattern-included image line and the rising and falling edges of the indicator pulse, respectively.

24. The method of claim 18, wherein said vertical offset distance is measured by counting each image line being located between the topmost image line of the displayed image and said pattern-included image line.

25. The method of claim 18, wherein said horizontal coordinates of the user-selected area are equivalent to said measured horizontal distances of said vertical edges.

26. The method of claim 18, wherein said vertical coordinates of the user-selected area are obtained by adding said measured offset distance with said vertical distances of said user-selected area, respectively.

27. A method of controlling brightness of a user-selected area on a monitor screen, the method comprising:

receiving, by an image source device, an input specifying the user-selected area within a displayed image area of said monitor screen, said user-selected area being less than said displayed image area;

adding, by said image source, a line pattern to an original image, said line pattern including coordinate information of said user-selected area and having an indicator signal whose rising and falling edges ends are horizontally aligned with vertical edges of said user-selected area;

displaying an image frame comprising a plurality of image lines and said line pattern are integrated in one of said plurality of image lines of said image frame;

determining a starting point of a topmost image line of said displayed image frame as a reference point;

detecting, by a monitor device driving said monitor screen, said line pattern included in an image line of said original image;

measuring horizontal distances between each of said vertical edges and said reference point;

identifying said user-selected area by calculating horizontal coordinates of the user-selected area from said measured horizontal distances; and amplifying a brightness gain of said identified user-selected area.

28. A method of controlling brightness of a user-selected area on a monitor screen, the method comprising:

receiving, by an image source device, and an input specifying a user-selected area within a displayed image area of said monitor screen, said user-selected area being less than said displayed image area;

adding, by said image source device, a line pattern to an original image, said line pattern providing coordinate information of said user-selected area;

displaying an image frame comprising a plurality of image lines and said line pattern are integrated in one of said plurality of image lines of said image frame;

determining a starting point of a topmost image line of said displayed image frame as a reference point;

detecting, by a monitor driving said monitor screen, said line pattern included in an image line of said original image, said pattern including vertical distances between upper and lower edges of said user-selected area and the pattern-included image line;

measuring a vertical offset distance between said reference point and said pattern-included image line;

identifying said user-selected area by calculating vertical coordinates of the user-selected area from said measured offset distances; and amplifying a brightness gain of said identified user-selected area.

* * * * *